United States Patent
Miyoshi (10) Patent No.: US 8,014,396 B2
(45) Date of Patent: Sep. 6, 2011

(54) BASE STATION APPARATUS AND TRANSMISSION METHOD THEREOF

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 537 days.

(21) Appl. No.: 10/567,826

(22) PCT Filed: Aug. 12, 2004

(86) PCT No.: PCT/JP2004/011619
§ 371 (c)(1), (2), (4) Date: Mar. 6, 2006

(87) PCT Pub. No.: WO2005/018266
PCT Pub. Date: Feb. 24, 2005

(65) Prior Publication Data
US 2006/0159057 A1      Jul. 20, 2006

(30) Foreign Application Priority Data
Aug. 13, 2003   (JP) .................................. 2003-293181

(51) Int. Cl.
*H04L 12/28* (2006.01)

(52) U.S. Cl. ......................... 370/392; 370/328; 370/471

(58) Field of Classification Search .................. 370/354, 370/352, 493, 468, 235, 232; 709/232, 225, 709/231, 207, 235, 249, 238
See application file for complete search history.

(56) References Cited

U.S. PATENT DOCUMENTS

| | | | |
|---|---|---|---|
| 4,052,568 A * | 10/1977 | Jankowski | 704/233 |
| 5,881,061 A | 3/1999 | Iizuka | |
| 6,269,095 B1 * | 7/2001 | Neubauer et al. | 370/352 |
| 6,330,451 B1 * | 12/2001 | Sen et al. | 455/452.2 |
| 6,363,429 B1 * | 3/2002 | Ketcham | 709/235 |
| 6,421,350 B1 | 7/2002 | Szurkowski et al. | |
| 6,584,098 B1 * | 6/2003 | Dutnall | 370/354 |
| 6,879,834 B2 | 4/2005 | Virtanen | |
| 6,917,587 B1 * | 7/2005 | Sarkar et al. | 370/230 |
| 6,961,331 B2 * | 11/2005 | Tokunaga et al. | 370/352 |
| 7,266,127 B2 * | 9/2007 | Gupta et al. | 370/413 |
| 7,333,475 B2 * | 2/2008 | LeBlanc et al. | 370/352 |
| 7,372,847 B2 * | 5/2008 | Koistinen | 370/352 |
| 2002/0026310 A1 * | 2/2002 | Mochida et al. | 704/201 |

(Continued)

FOREIGN PATENT DOCUMENTS
JP         08-251229         9/1996
(Continued)

OTHER PUBLICATIONS
PCT International Search Report dated Nov. 22, 2004.
(Continued)

*Primary Examiner* — Michael J Moore, Jr.
(74) *Attorney, Agent, or Firm* — Dickinson Wright PLLC (57) ABSTRACT

A base station apparatus that limits the influx of speech data into a packet channel and that enables the service quality of the packet channel to be prevented from degrading. In this apparatus, a protocol detecting section (301) detects a protocol contained in an IP header of a packet. Based on the protocol, a packet type detecting section (302) detects a type of packet. Based on the type of packet, a delay addition control section (303) determines whether or not to add a delay. Specifically, when the packet is of VoIP, the delay addition control section (303) instructs a switching section (304) to output the packet to a delay adding section (103), and further instructs the delay adding section (103) to add a delay. Meanwhile, when the packet is an IP packet, the delay addition control section (303) instructs the switching section (304) to output the packet to a scheduler (104).

3 Claims, 8 Drawing Sheets

U.S. PATENT DOCUMENTS

| | | | |
|---|---|---|---|
| 2002/0097679 A1* | 7/2002 | Berenbaum | 370/232 |
| 2003/0202475 A1* | 10/2003 | Chen et al. | 370/235 |
| 2003/0227907 A1* | 12/2003 | Choi et al. | 370/352 |
| 2004/0022237 A1* | 2/2004 | Elliott et al. | 370/356 |
| 2004/0032860 A1* | 2/2004 | Mundra et al. | 370/352 |

FOREIGN PATENT DOCUMENTS

| | | |
|---|---|---|
| JP | 09-055768 | 2/1997 |
| JP | 11163944 | 6/1999 |
| JP | 2002217986 | 8/2002 |
| JP | 2002262345 | 9/2002 |
| JP | 2002533030 | 10/2002 |
| JP | 2003199145 | 7/2003 |

OTHER PUBLICATIONS

Japanese Office Action dated Oct. 20, 2009.

* cited by examiner

PRIOR ART
FIG. 1

|  | CLASS A (LEVEL OF FIXED-LINE PHONE) | CLASS B (LEVEL OF CELLULAR PHONE) | CLASS C | GENERAL IP PACKET |
| --- | --- | --- | --- | --- |
| ALLOWABLE DELAY TIME | 100ms OR LESS | 150ms OR LESS | 400ms OR LESS | 500ms OR LESS |
| ALLOWABLE JITTER TIME | 10ms OR LESS | 15ms OR LESS | 40ms OR LESS | 50ms OR LESS |

BASE STATION APPARATUS AND TRANSMISSION METHOD THEREOF

TECHNICAL FIELD

The present invention relates to a base station apparatus that transmits speech signals on a bearer channel and packets on a packet channel, and to a transmission method of such an apparatus.

BACKGROUND ART

Figure 1:
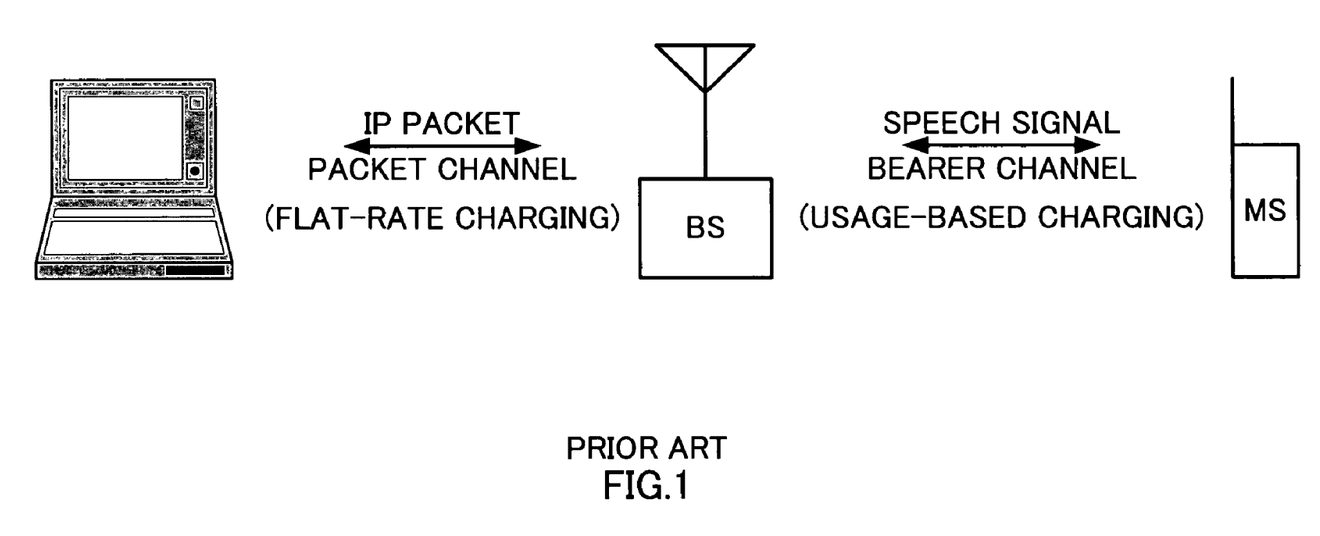
FIG. 1 is a view showing the relationship between a channel and charging.

As shown in FIG. 1, generally, speech signals communicated between a cellular phone (MS) and base station apparatus (BS) are sent on a bearer channel, and the bearer channel is of usage-based charging. Meanwhile, IP packets communicated between a personal computer and base station apparatus are sent on a packet channel, and the packet channel is of flat-rate charging.

Figure 2:
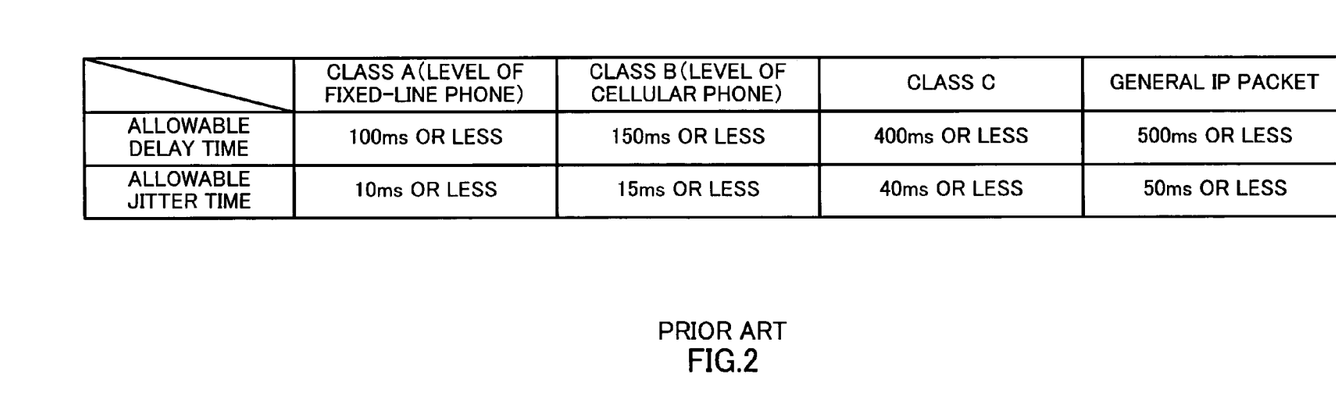
FIG. 2 is a diagram illustrating the relationship between each type of packet and communication quality.

Further, as shown in FIG. 2, the quality of communication is determined by allowable delay time and allowable jitter time, and higher quality is required in fixed-line phone and cellular phone than that of IP packet.

In recent years, the quality has been improved by technical progress such as absorption of jitter, reduction in delay time, measures against packet loss and the like, and it has been possible to communicate data while guaranteeing the same degree of quality in the packet channel as that of fixed-line phone and cellular phone.

Therefore, telephones have become widespread using the packet channel such as VoIP (Voice Over IP) and the like. It is expected that the number of users rapidly increases in the feature who use the inexpensive packet channel for speech call.

[See Patent Document 1] National Publication of International Patent Application No. 2002-533030

DISCLOSURE OF INVENTION

Problems to be Solved by the Invention

However, the conventional base station apparatus transmits all the packets received from an upper station to communication terminal apparatuses irrespective of the type of packet. Therefore, when a large amount of data is sent on the packet channel, such a fear arises that the service quality degrades in the packet channel.

It is an object of the present invention to provide a base station apparatus that limits the influx of speech data into the packet channel to prevent the service quality of the packet channel from degrading and a transmission method of such an apparatus.

Means for Solving the Problem

A base station apparatus of the invention is a base station apparatus which transmits speech signals on a bearer channel and packets on a packet channel, and is provided with a channel type detector that detects whether a type of channel is the bearer channel or the packet channel for each session, and a delay adder that delays a packet to be transmitted on the packet channel when the detected type of channel is the packet channel.

A transmission method of a base station apparatus of the invention is a transmission method of a base station apparatus that transmits speech signals on a bearer channel and packets on a packet channel, and has the steps of detecting whether a type of channel is the bearer channel or the packet channel for each session, and delaying a packet to be transmitted on the packet channel when the detected type of channel is the packet channel.

Advantageous Effect of the Invention

According to the invention, detecting the type of channel for each session, or detecting the type of packet makes the quality be degraded by intentionally adding a delay to a packet of VoIP, it is therefore possible to limit the influx of speech data into the packet channel and prevent the service quality of the packet channel from degrading.

BEST MODE FOR CARRYING OUT THE INVENTION

Embodiments of the invention will specifically be described below with reference to accompanying drawings.

Embodiment 1

Embodiment 1 describes a case of detecting the type of channel for each session based on information from an upper station and intentionally adding a delay to a packet to be transmitted on a packet channel. The session is determined from a transmission source IP address and destination IP address contained in an IP header.

Figure 3:
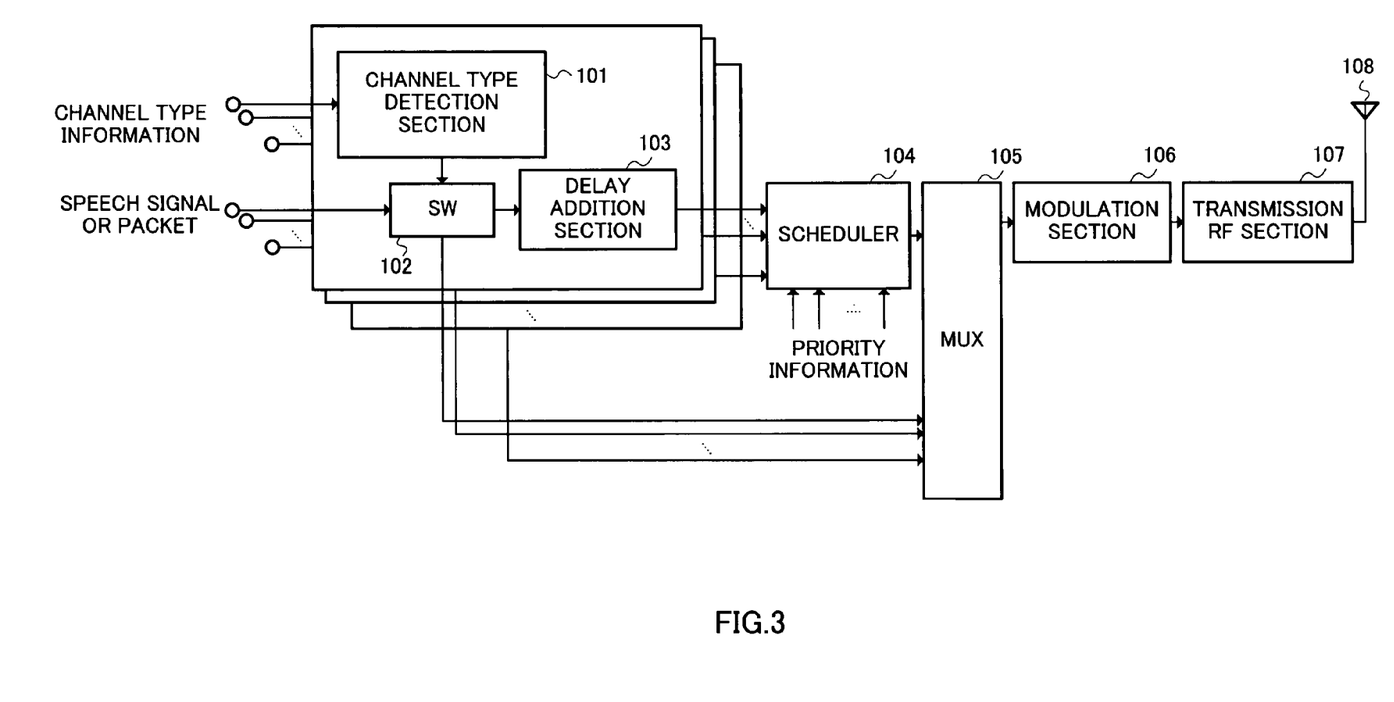
FIG. 3 is a block diagram illustrating a configuration of a base station apparatus according to Embodiment 1 of the invention.

FIG. 3 is a block diagram illustrating a configuration of a base station apparatus according to Embodiment 1 of the invention. The base station apparatus as shown in FIG. 3 is principally comprised of channel type detecting sections 101, switching sections 102, delay adding sections 103, scheduler 104, multiplexing section 150, modulation section 106, transmission RF section 107, and transmission antenna 108. Channel type detecting sections 101, switching sections 102 and delay adding sections 103 are prepared corresponding to the number of sessions.

Channel type detecting section 101 detects whether a type of channel is the packet channel or bearer channel for each session based on information (hereinafter, referred to as "channel type information") indicating a channel type received from an upper station. Then, channel type detecting section 101 controls switching section 102 so as to output a packet transmitted on the packet channel to delay adding section 103, and output a speech signal transmitted on the bearer channel to multiplexing section 105. Based on control of channel type detecting section 101, switching section 102 outputs the packet to delay adding section 103 and the speech signal to multiplexing section 105.

Figure 4A:
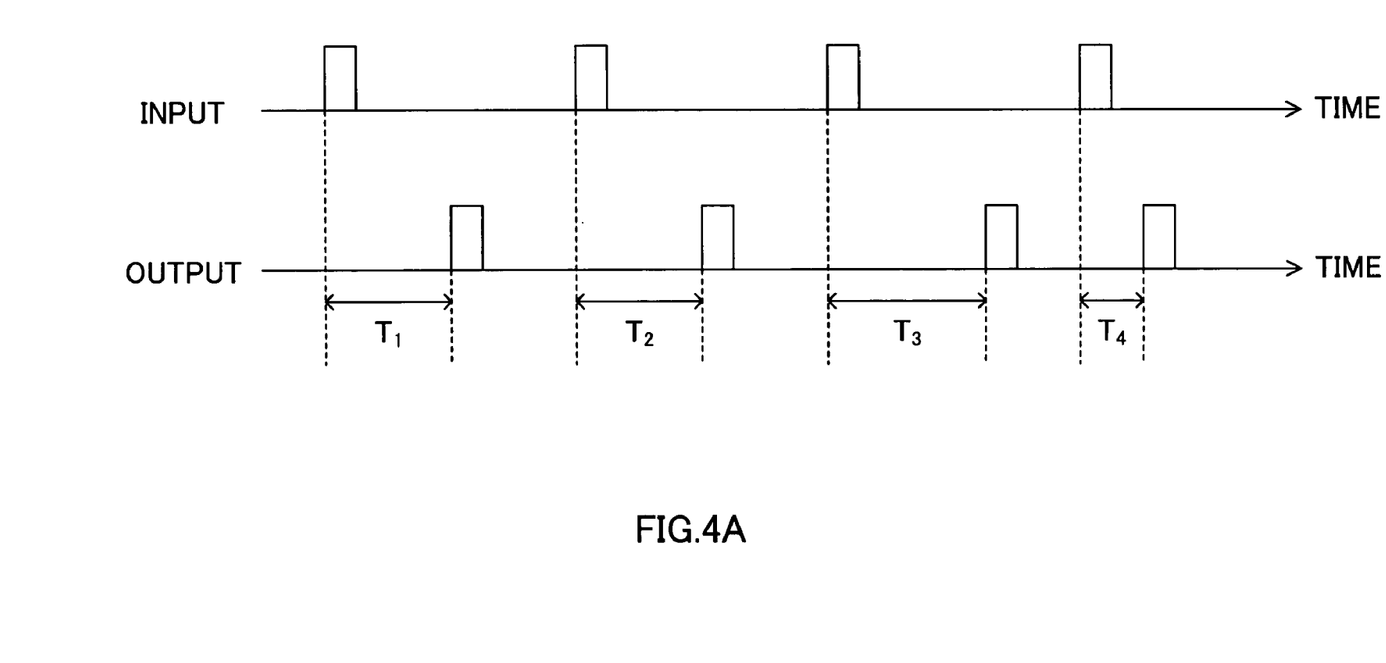
FIG. 4A is a chart illustrating a transmission state of packets that are input and output to/from a delay adder of the base station apparatus according to the above Embodiment and also illustrating variation of a delay amount.
Figure 4B:
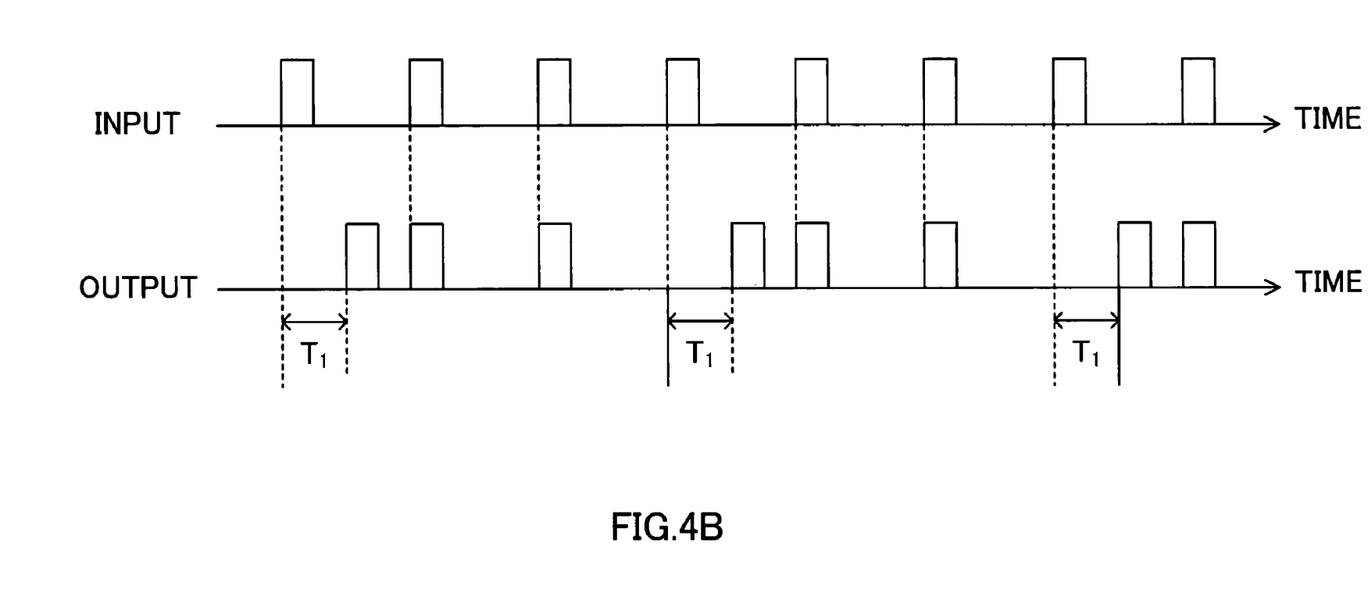
FIG. 4B is a chart illustrating a transmission state of packets that are input and output to/from the delay adder of the base station apparatus according to the above Embodiment and also illustrating generation of a delay at intervals of predetermined time.

Delay adding section 103 delays the packet and outputs to scheduler 104. In addition, as a method of adding a delay, an amount of delay may be varied (jitter is added) without being kept constant as shown in FIG. 4A, or the delay can be generated at intervals of predetermined time without targeting all the packets as shown in FIG. 4B. In addition, FIGS. 4A and 4B are charts illustrating a transmission state of packets that are input and output to/from delay adding section 103. According to these methods, it is possible to degrade the quality of speech data reliably and reduce degradation in the entire quality of packets.

Scheduler 104 performs scheduling, that is to say, determining a communication terminal apparatus to transmit a packet and transmission timing based on priority information indicating propagation environments or reception quality of each communication terminal apparatus, and outputs the packet to multiplexing section 105 corresponding to a result of the determination.

Multiplexing section 105 multiplexes the packet output from scheduler 104 and the speech signal output from switching section 102 and outputs to modulation section 106. Modulation section 106 modulates data of the packet, and outputs the modulated packet data to transmission RF section 107. Transmission RF section 107 performs transmission power control and upconverting on the modulated packet data, and transmits the radio signal from transmission antenna 108.

Thus, according to this Embodiment, it is possible to detect the type of channel for each session based on the information from the upper station and intentionally add a delay to a packet transmitted on the packet channel. When the packet is thus given the delay and transmitted, the packet of speech data results in the quality such that the user cannot stand listening to the speech, while the packet of an IP packet results in the quality without any trouble. As a result, it is possible to limit the influx of speech data into the packet channel and prevent the service quality of the packet channel from degrading.

Embodiment 2

Embodiment 2 describes a case of detecting a type of packet based on a protocol or flag in an IP header and intentionally adding a delay to a packet of VoIP.

Figure 5:
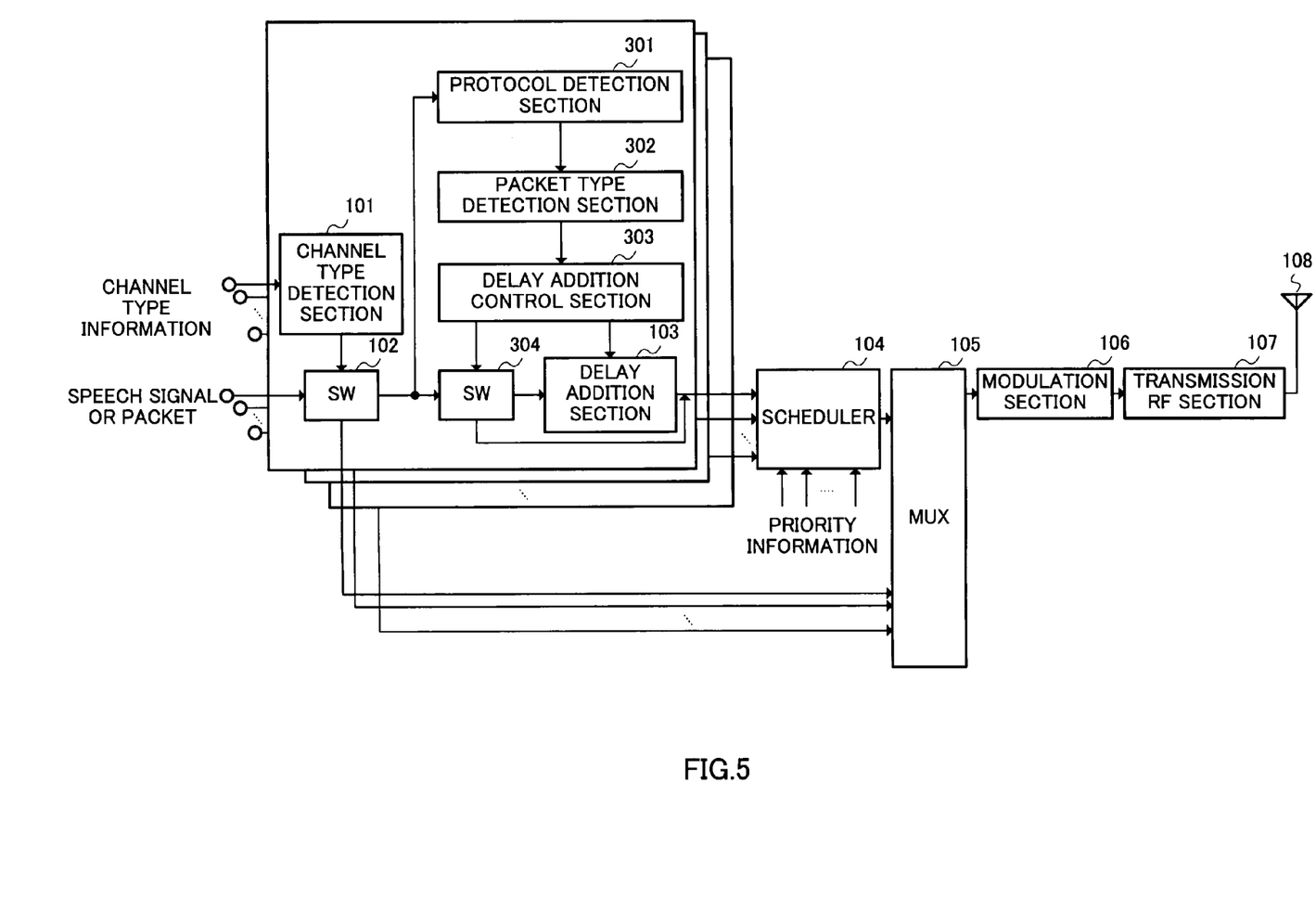
FIG. 5 is a block diagram illustrating a configuration of a base station apparatus according to Embodiment 2 of the invention.

FIG. 5 is a block diagram illustrating a configuration of a base station apparatus according to Embodiment 2 of the invention. In the base station apparatus as shown in FIG. 5, structural elements common to FIG. 3 are assigned the same reference numerals as in FIG. 3 to omit descriptions thereof.

The base station apparatus as shown in FIG. 5 adopts a configuration with protocol detecting sections 301, packet type detecting sections 302, delay addition control sections 303, and switching sections 304 added as compared with FIG. 3. In addition, protocol detecting sections 301, packet type detecting sections 302, delay addition control sections 303, and switching sections 304 are prepared corresponding to the number of sessions.

Protocol detecting section 301 detects a protocol contained in an IP header of a packet, and outputs a result of the detection to packet type detecting section 302. In addition, protocol detecting section 301 may detect a flag contained in an IP header of a packet, and when such a flag is set that clearly indicates speech data, detect that the type of packet is VoIP.

Based on the protocol or flag, packet type detecting section 302 detects the type of packet, and outputs a result of the detection to delay addition control section 303. For example, when the protocol is UDP, packet type detecting section 302 detects that the type of packet is VoIP.

Delay addition control section 303 determines whether or not to add a delay corresponding to the type of packet, and controls switching section 304 and delay adding section 103. More specifically, when the packet is of VoIP, delay addition control section 303 instructs switching section 304 to output the packet to delay adding section 103, and further instructs delay adding section 103 to add a delay. Meanwhile, when the packet is an IP packet, delay addition control section 303 instructs switching section 304 to output the packet to scheduler 104.

Based on control of delay addition control section 303, switching section 304 outputs the packet of VoIP to delay adding section 103, while outputting the IP packet to scheduler 104. Based on control of delay addition control section 303, delay adding section 103 delays the packet and outputs to scheduler 104.

Thus, according to this Embodiment, it is possible to detect the type of packet based on the protocol or flag in the IP header and to intentionally add a delay to a predetermined type of packet such as speech data and the like targeted for limitation of the influx into the packet channel.

Embodiment 3

Embodiment 3 describes a case of detecting a type of packet based on a generation period of packet and intentionally adding a delay to a packet of VoIP.

Figure 6:
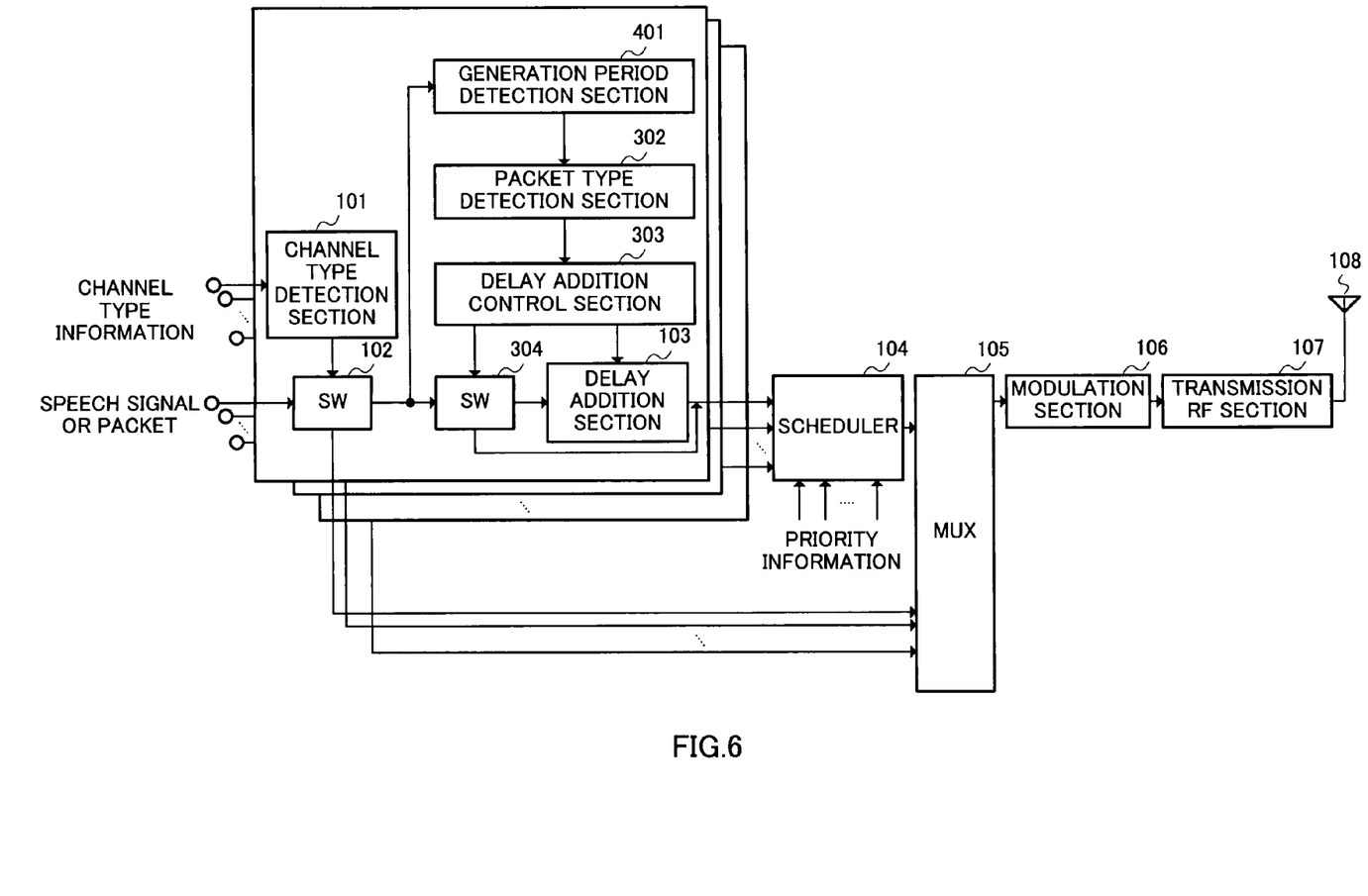
FIG. 6 is a block diagram illustrating a configuration of a base station apparatus according to Embodiment 3 of the invention.

FIG. 6 is a block diagram illustrating a configuration of a base station apparatus according to Embodiment 3 of the invention. In addition, in the base station apparatus as shown in FIG. 6, structural elements common to FIG. 5 are assigned the same reference numerals as in FIG. 5 to omit descriptions thereof.

The base station apparatus as shown in FIG. 6 adopts a configuration added with a generation period detecting sections 401 that substitutes for protocol detecting sections 301 as compared with FIG. 5. In addition, generation period detecting sections 401 are prepared corresponding to the number of sessions.

Generation period detecting section 401 calculates an average value of generation period of packet, and outputs the calculated average value of generation period of packet to packet type detecting section 302. In addition, it is possible to judge speech data from the generation frequency of data by acquiring encoding period information of a speech encoder and judging data generated in a period close to the encoding period as speech data. Further, generation period detecting section 401 may calculate the jitter (fluctuations on generation period) of packet, and output the calculated jitter to packet type detecting section 302.

Based on a size relationship between the average generation period and predetermined threshold, packet type detecting section 302 detects the type of packet, and outputs a result of the detection to delay addition control section 303. For example, when the average generation period is 25 ms or less, packet type detecting section 302 detects that the type of packet is VoIP. Further, packet type detecting section 302 may detect the type of packet based on a size relationship between the jitter of packet and predetermined threshold, and output a result of the detection to delay addition control section 303. For example, when the average generation period is 25 ms or less and the jitter is 5 ms or less, packet type detecting section 302 detects that the type of packet is VoIP.

Thus, according to this Embodiment, it is possible to detect the type of packet based on the size relationship between the average generation period and predetermined threshold and to intentionally add a delay to a predetermined type of packet such as speech data and the like targeted for limitation of the influx into the packet channel.

In addition, Embodiments 2 and 3 can be combined. In other words, packet type detecting section 302 may detect a packet based on the protocol (or flag) and average generation period (and further, the jitter of packet) For example, when the protocol is UDP and the average generation period is 25 ms or less, packet type detecting section 302 detects that the type of packet is VoIP.

Embodiment 4

Embodiment 4 describes a case of intentionally adding a delay to a packet of VoIP in ascending order of user priority, as an amount of data increases that is transmitted in a base station apparatus.

Figure 7:
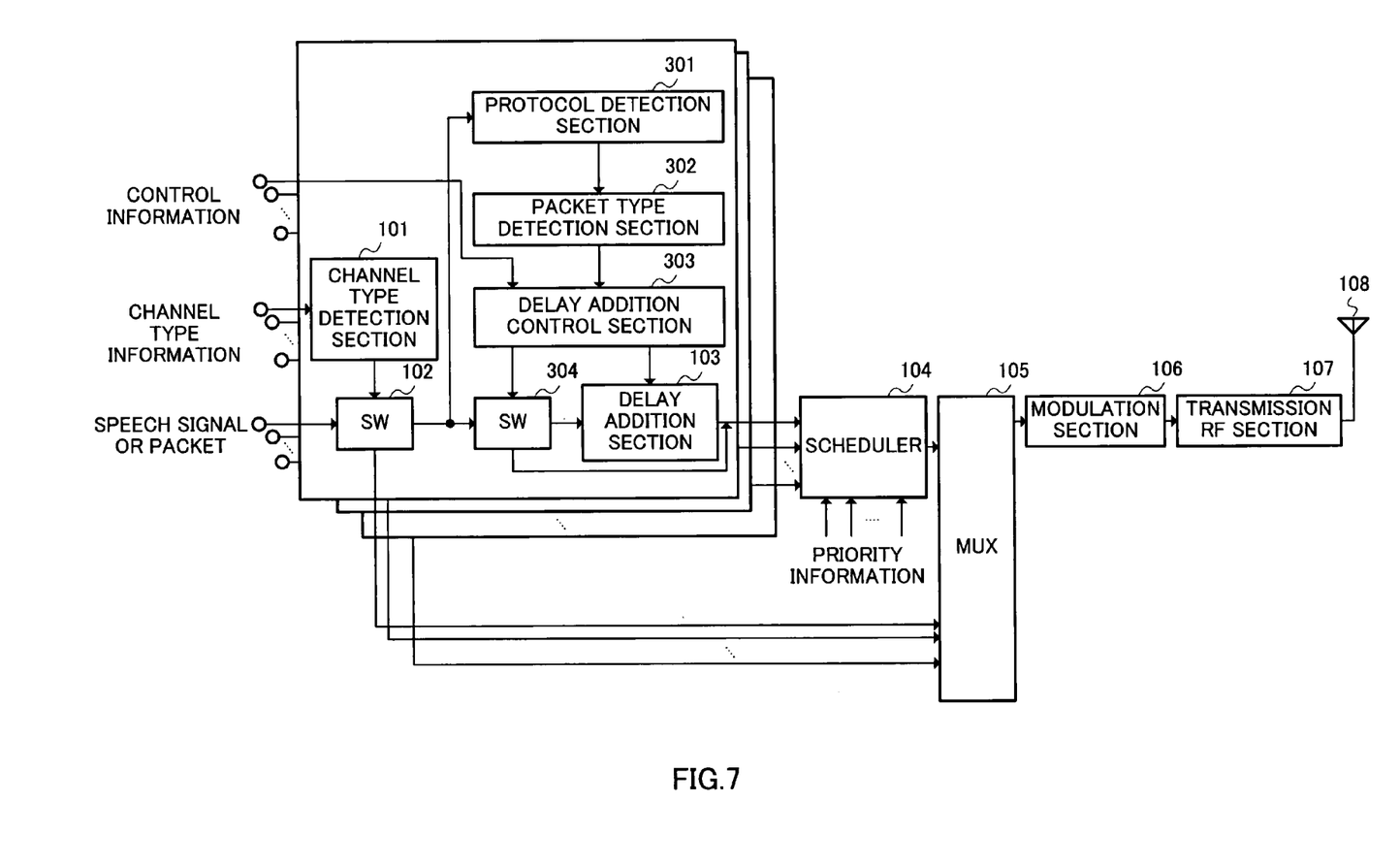
FIG. 7 is a block diagram illustrating a configuration of a base station apparatus according to Embodiment 4 of the invention.

FIG. 7 is a block diagram illustrating a configuration of a base station apparatus according to Embodiment 4 of the invention. In addition, in the base station apparatus as shown in FIG. 7, structural elements common to FIG. 5 are assigned the same reference numerals as in FIG. 5 to omit descriptions thereof.

The base station apparatus as shown in FIG. 7 differs from FIG. 5 in that control information instructing execution of delay addition control is input to delay addition control section 303 from an upper station.

The upper station registers the priority of each user, and is set for a data amount (hereinafter, referred to as "reference data amount") that is reference to add a delay for each priority in the system. In addition, as the priority decreases, the reference data amount is set lower. Then, the upper station monitors an amount of data transmitted in each base station apparatus, and transmits the control information to instruct execution of delay addition control to delay addition control section 303 corresponding to a session of a user such that the transmitted data amount exceeds the reference data amount.

Only when the control information is input from the upper station, delay addition control section 303 performs control to add a delay corresponding to the type of packet.

As a result, it is possible to intentionally add a delay to a packet of VoIP in ascending order of user priority as an amount of data transmitted in the base station apparatus increases.

In addition, Embodiment 4 may adopt a configuration where generation period detecting sections 401 are substituted for protocol detecting sections 301 as shown in FIG. 7, the type of packet is detected based on the generation period of packet as in Embodiment 3, and when the control information is input from the upper station, a delay can be intentionally added to a packet of VoIP.

Each of functional blocks used in the descriptions of above-mentioned Embodiments is implemented typically as an LSI that is an integrated circuit. Each of the blocks may be configured in one-chip form, or may be configured in one-chip form including a part or all of the blocks.

Herein, the LSI is assumed, but the circuit may be referred to as an IC, system LSI, super LSI or ultra LSI corresponding to the degree of integration.

Further, the method of integrating circuits is not limited to the LSI, and may be achieved by a dedicated circuit or general processor. It may be possible to use FPGA (Field Programmable Gate Array) enabling programming after manufacturing the LSI or a reconfigurable processor enabling reconfiguration of connection and/or setting of the circuit cell inside the LSI.

Furthermore, if technique appears for integrating circuits substituting for the LSI with progress in semiconductor technique or another derived technique, the functional blocks may naturally be integrated using such technique. Adaptation and the like of biotechnology may have the potential.

This application is based on Japanese Patent Application No. 2003-293181 filed on Aug. 13, 2003, entire content of which is expressly incorporated by reference herein.

INDUSTRIAL APPLICABILITY

The base station apparatus and transmission method thereof according to the present invention, when speech signals are transmitted on a bearer channel and packets are transmitted on a packet channel, limit the influx of speech data into the packet channel, and thus are useful in preventing the service quality of the packet channel from degrading.

The invention claimed is:

1. A base station apparatus that transmits a speech packet and a normal packet other than the speech packet on a packet channel, the base station apparatus comprising:
   a detecting section that detects a type of a transmission packet; and
   a delay section that adds a transmission delay to the speech packet transmitted on the packet channel to degrade quality of the speech packet when the detected type shows the speech packet, and that does not add a transmission delay to the normal packet transmitted on the packet channel to maintain quality of the normal packet when the detected type shows the normal packet, wherein:
   the delay section adds the transmission delay to the speech packet according to a priority of a communication terminal apparatus receiving the speech packet and adds the transmission delay to the speech packet to be received in a communication terminal apparatus to which an amount of data exceeding a reference data amount is sent, the reference data amount being set per the priority.

2. The base station apparatus according to claim 1, wherein the reference data amount is set lower for a lower priority.

3. A transmission method in a base station apparatus that transmits a speech packet and a normal packet other than the speech packet on a packet channel, the transmission method comprising:
   detecting a type of a transmission packet; and
   adding a transmission delay to the speech packet transmitted on the packet channel to degrade the quality of the speech packet when the detected type shows the speech packet, and adding no transmission delay to the normal packet transmitted on the packet channel to maintain the quality of the normal packet when the detected type shows the normal packet, wherein:
   the step of adding adds the transmission delay to the speech packet according to a priority of a communication terminal apparatus receiving the speech packet and adds the transmission delay to the speech packet to be received in a communication terminal apparatus to which an amount of data exceeding a reference data amount is sent, the reference data amount being set per the priority.

* * * * *